United States Patent [19]
Ikeda et al.

[11] Patent Number: 5,491,188
[45] Date of Patent: Feb. 13, 1996

[54] POROUS STRETCHED ARTICLE OF POLYPROPYLENE-BASED RESIN AND PROCESS FOR ITS PREPARATION

[75] Inventors: Naoki Ikeda, Soraku; Masafumi Yoshimura, Kuze; Kazuaki Mizoguchi, Uji; Yoshiharu Kimura, Omihachiman, all of Japan

[73] Assignee: New Japan Chemical Co., Ltd., Kyoto, Japan

[21] Appl. No.: 245,040

[22] Filed: May 17, 1994

[30] Foreign Application Priority Data

May 20, 1993 [JP] Japan .................................. 5-143037

[51] Int. Cl.$^6$ ................................................. C08K 5/20
[52] U.S. Cl. ........................... 524/229; 264/41; 264/154; 264/288.8; 264/290.2
[58] Field of Search ............................ 524/229; 264/41, 264/154, 288.8, 290.2

[56] References Cited

U.S. PATENT DOCUMENTS 4,726,989  2/1988  Mrozinski et al. .................. 264/288.8
4,863,997  9/1989  Shibuya et al. .......................... 524/186
5,132,157  7/1992  Asanuma et al. ..................... 264/288.8

*Primary Examiner*—Peter D. Mulcahy
*Attorney, Agent, or Firm*—Armstrong, Westerman, Hattori, McLeland & Naughton

[57] ABSTRACT

Disclosed are a process for producing a porous stretched article of β-crystalline polypropylene-based resin, the process comprising the steps of crystallizing a melt of a polypropylene-based resin composition at a temperature of 15° to 140° C. to form a solidified product containing β-form crystals and stretching the resulting solidified product at a temprature which is higher than 20° C. but lower than the melting point of the β-form crystals in said solidified product, the polypropylene-based resin composition comprising a polypropylene-based resin and 0.0001 to 5 parts by weight, per 100 parts by weight of the polypropylene-based resin, of at least one specific amide compound; and a porous stretched article produced by the process.

19 Claims, No Drawings

POROUS STRETCHED ARTICLE OF POLYPROPYLENE-BASED RESIN AND PROCESS FOR ITS PREPARATION

FIELD OF THE INVENTION

The present invention relates to a process for producing a porous stretched product of β-crystalline polypropylene-based resin and to the stretched product of polypropylene-based resin produced by this process.

PRIOR ART

Various processes for preparing porous polypropylene-based materials are known. For example, the following processes are known.

(1) a process comprising admixing an inorganic substance and/or a non-compatible resin with polypropylene, extruding the mixture into a film and orienting or drawing the film to thereby obtain a porous film (Japanese Unexamined Patent Publication (Kokai) No. 116561/1975, etc.); and (2) a process comprising admixing an inorganic substance or an organic liquid with polypropylene, extracting the mixture with a solvent or alkali, extruding the mixture into a film and stretching the film to thereby obtain a porous film (Japanese Unexamined Patent Publication No. 59072/1983, etc.).

The process (1) has the drawbacks that the inorganic substance bleeds out, and that the resulting film has a reduced elongation at break, and the process (2) entails the drawback of requiring troublesome procedures such as time-consuming extraction step.

Also known is a process (3) for producing a porous film, utilizing a crystal form (β-form crystal) peculiar to polypropylene (Japanese Examined Patent Publication (Kokoku) No. 40411/1980, etc.). However, this process has difficulty in forming a sufficient amount of β-form crystals under practical conditions and does not give a porous film having satisfactory porosity.

Processes heretofore proposed for producing β-form crystals of polypropylene include, for example, a process in which a melt of polypropylene is crystallized under a temperature gradient, or a process using a small amount of a β-nucleating agent (γ-quinacridone) (POLYMER LETTERS, 6, 539–546, (1968)). The former process has the shortcomings of taking a long time and giving only a small quantity of product. The latter process is deficient in requiring a specially designed apparatus and procedure for admixing the nucleating agent with polypropylene, and has a further problem of being low in usefulness in that it is necessary to conduct crystallization step at a high temperature in order to form a certain increased amount of β-form crystals in the unoriented product, thereby requiring a long time for molding. In addition, the process has additional problem that the product is red colored. The present inventors have proposed various novel nucleating agents for increasing the content of β-form crystals to obviate the foregoing problems (U.S. application Ser. No. 08/003,659).

SUMMARY OF THE INVENTION

An object of the present invention is to improve the above process (3) and to thereby provide a novel and useful process for preparing under practical conditions a porous polypropylene-based material exhibiting satisfactory properties.

To overcome the drawbacks of conventional technologies, the present inventors conducted extensive researches and found that the contemplated stretched porous article can be obtained by crystallizing at a specific temperature a melt of a polypropylene containing an amide compound of specific structure as a β-nucleating agent in a predetermined amount, and stretching the resulting product at a specific temperature. The inventors have completed the present invention on the basis of this finding.

The present invention provides a process for producing a porous stretched article of a β-crystalline polypropylene-based resin, the process comprising the steps of crystallizing a melt of a polypropylene-based resin composition at a temperature of 15° to 140° C. to form a solidified product containing β-form crystals and stretching the resulting solidified product at a temprature which is higher than 20° C. but lower than the melting point of the β-form crystals in said solidified product, the polypropylene-based resin composition comprising a polypropylene-based resin and 0.0001 to 5 parts by weight, per 100 parts by weight of the polypropylene-based resin, of at least one amide compound selected from the group consisting of:

(1) an amide compound of the formula

$$R^2\text{—NHCO—}R^1\text{—CONH—}R^3 \qquad (1)$$

wherein $R^1$ is a $C_{1-24}$ saturated or unsaturated aliphatic dicarboxylic acid residue, a $C_{4-28}$ saturated or unsaturated alicycic dicarboxylic acid residue or a $C_{6-28}$ aromatic dicarboxylic acid residue; $R^2$ and $R^3$ are the same or different and each represents a $C_{3-18}$ cycloalkyl group, a $C_{3-12}$ cycloalkenyl group, or a group of the formula

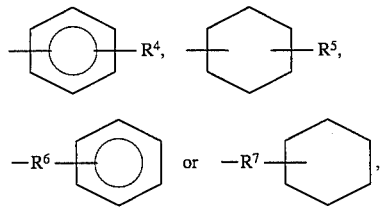

wherein $R^4$ is a hydrogen atom, a $C_{1-12}$ straight- or branched-chain alkyl group, a $C_{2-12}$ straight- or branched-chain alkenyl group, a $C_{6-10}$ cycloalkyl group or phenyl group; $R^5$ is a $C_{1-12}$ straight- or branched-chain alkyl group or a $C_{2-12}$ straight- or branched-chain alkenyl group; and $R^6$ and $R^7$ each represents a $C_{1-4}$ straight- or branched-chain alkylene group;

(2) an amide compound of the formula

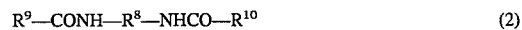

$$R^9\text{—CONH—}R^8\text{—NHCO—}R^{10} \qquad (2)$$

wherein $R^8$ is a $C_{1-24}$ saturated or unsaturated aliphatic diamine residue, a $C_{4-28}$ alicyclic diamine residue, a $C_{4-14}$ heterocyclic diamine residue or a $C_{6-28}$ aromatic diamine residue; $R^9$ and $R^{10}$ are the same or different and each represents a $C_{3-12}$ cycloalkyl group, a $C_{3-12}$ cycloalkenyl group, or a group of the formula

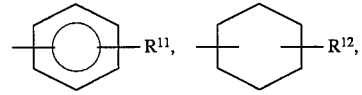

-continued

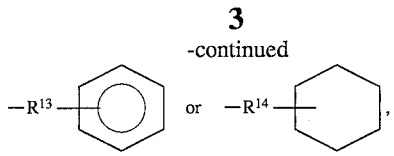

wherein $R^{11}$ is a hydrogen atom, a $C_{1-12}$ straight- or branched-chain alkyl group, a $C_{2-12}$ straight- or branched-chain alkenyl group, a $C_{6-10}$ cycloalkyl group or phenyl group; $R^{12}$ is a $C_{1-12}$ straight- or branched-chain alkyl group, a $C_{2-12}$ alkenyl group, a $C_{6-10}$ cycloalkyl group or phenyl group; and $R^{13}$ and $R^{14}$ each represents a $C_{1-4}$ straight- or branched-chain alkylene group; and (3) an amide compound of the formula $$R^{16}\text{—CONH—}R^{15}\text{—CONH—}R^{17} \quad (3)$$

wherein $R^{15}$ is a $C_{1-28}$ saturated or unsaturated aliphatic amino acid residue, a $C_{6-12}$ saturated or unsaturated alicyclic amino acid residue or a $C_{6-14}$ aromatic amino acid residue; $R^{16}$ and $R^{17}$ are the same or different and $R^{16}$ has the same meaning as $R^9$ or $R^{10}$ in the formula (2) and $R^{17}$ has the same meaning as $R^2$ or $R^3$ in the formula (1).

DETAILED DESCRIPTION OF THE INVENTION

The polypropylene-based resin for use in the present invention is a polymer composed predominantly of polypropylene. Examples of such polymers are propylene homopolymers, copolymers of propylene as a predominant comonomer and at least one comonomer selected from the group consisting of ethylene and at least one 1-alkene (including random copolymers and block copolymers), propylene-ethylene copolymers which further contain other comonomer(s) (such as those which further contain 5-ethylidene-2-norbornene, 5-methylene-2-norbornene or 1,4-hexadiene), propylene-styrene copolymers, etc. Also usable are a blend of polypropylene and a small quantity of a thermoplastic resin such as a high-density polyethylene, polybutene-1 or poly-4-methylpentene-1.

The melt flow rate (hereinafter referred to briefly as "MFR"; measured in accordance with JIS K 6758-1981) of the polypropylene-based resin can be appropriately selected according to the molding method to be employed and is generally about 0.1 to 100 g/10 min and preferably about 0.5 to 50 g/10 min, from the standpoint of processability and mechanical properties and other properties of the resulting stretched article.

In the present invention, amide compounds of the foregoing formulas (1), (2) and (3) are used.

Amide compounds of the formula (1)

The amide compounds of the formula (1) are known or can be easily prepared by conventional methods, for example, by subjecting an aliphatic, alicyclic or aromatic dicarboxylic acid of the the formula $$\text{HOOC—}R^1\text{—COOH} \quad (1a)$$

wherein $R^1$ is as defined hereinbefore to amidation reaction with an alicyclic or aromatic monoamine of the formula $$R^2\text{—}NH_2 \text{ or } R^3\text{—}NH_2$$

wherein $R^2$ and $R^3$ are as defined hereinbefore.

As the dicarboxylic acid of the formula (1a), there may be mentioned the aliphatic, alicyclic or aromatic dicarboxylic acid corresponding to $R^1$. Thus, $R^1$ is a residue formed by elimination of the two carboxyl groups of one of the following aliphatic, alicylic and aromatic dicarboxylic acids.

The aliphatic dicarboxylic acid specifically includes $C_{3-26}$, preferably $C_{3-14}$ saturated or unsaturated aliphatic dicarboxylic acids, such as malonic acid, diphenylmalonic acid, succinic acid, phenylsuccinic acid, diphenylsuccinic acid, glutaric acid, 3,3-dimethylglutaric acid, adipic acid, pimelic acid, suberic acid, azelaic acid, sebacic acid, 1,12-dodecanedioic acid, 1,14-tetradecanedioic acid, 1,18-octadecanedioic acid and so on.

The alicyclic dicarboxylic acid specifically includes $C_{6-30}$, preferably $C_{8-12}$ saturated or unsaturated alicyclic dicarboxylic acids such as 1,2-cyclohexanedicarboxylic acid, 1,4-cyclohexanedicarboxylic acid, 1,4-cyclohexanediacetic acid and so on.

The aromatic dicarboxylic acid specifically includes $C_{8-30}$, preferably $C_{8-22}$ aromatic dicarboxylic acids such as p-phenylenediacetic acid, p-phenylenediethanoic acid, phthalic acid, 4-tert-butylphthalic acid, isophthalic acid, 5-tert-butylisophthalic acid, terephthalic acid, 1,8-naphthalic acid, 1,4-naphthalenedicarboxylic acid, 2,6-naphthalenedicarboxylic acid, 2,7-naphthalenedicarboxylic acid, diphenic acid, 3,3'-biphenyldicarboxylic acid, 4,4'-biphenyldicarboxylic acid, 4,4'-binaphthyldicarboxylic acid, bis(3-carboxyphenyl)methane, bis(4-carboxyphenyl)methane, 2,2-bis(3-carboxyphenyl)propane, 2,2-bis(4-carboxyphenyl)propane, 3,3'-sulfonyldibenzoic acid, 4,4'-sulfonyldibenzoic acid, 3,3'-oxydibenzoic acid, 4,4'-oxydibenzoic acid, 3,3'-carbonyldibenzoic acid, 4,4'-carbonyldibenzoic acid, 3,3'-thiodibenzoic acid, 4,4'-thiodibenzoic acid, 4,4'-(p-phenylenedioxy)dibenzoic acid, 4,4'-isophthaloyldibenzoic acid, 4,4'-terephthaloyldibenzoic acid, dithiosalicylic acid and so on.

On the other hand, the monoamine to be used is the alicyclic or aromatic monoamine corresponding to $R^2$ or $R^3$, i.e., $R^2\text{—}NH_2$ or $R^3\text{—}NH_2$.

The alicyclic monoamine particularly includes $C_3$–$C_{18}$ cycloalkylamines, $C_3$–$C_{12}$ cycloalkenylamines,

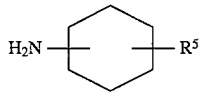

(wherein $R^5$ is as defined above),

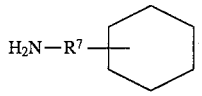

(wherein $R^7$ is as defined above) and the like, and specifically includes, among others, cyclopropylamine, cyclobutylamine, cyclopentylamine, cyclohexylamine, 2-methylcyclohexylamine, 3-methylcyclohexylamine, 4-methylcyclohexylamine, 2-ethylcyclohexylamine, 4-ethylcyclohexylamine, 2-propylcyclohexylamine, 2-isopropylcyclohexylamine, 4-propylcyclohexylamine, 4-isopropylcyclohexylamine, 2-tert-butylcyclohexylamine, 4-n-butylcyclohexylamine, 4-isobutylcyclohexylamine, 4-sec-butylcyclohexylamine, 4-tert-butylcyclohexylamine, 4-n-amylcyclohexylamine, 4-isoamylcyclohexylamine, 4-sec-amylcyclohexylamine, 4-tert-amylcyclohexylamine, 4-hexylcyclohexylamine, 4-heptylcyclohexylamine, 4-octylcyclohexylamine, 4-nonylcyclohexylamine, 4-decylcyclohexylamine, 4-undecylcyclohexylamine, 4-dodecylcyclohexylamine, 4-cyclohexylcyclohexylamine, 4-phenylcyclohexylamine, cycloheptylamine, cyclododecylamine, cyclohexylmethylamine, α-cyclohexylethylamine, β-cyclohexylethylamine, α-cyclohexylpropylamine, β-cyclohexylpropylamine, γ-cyclohexylpropylamine and so on.

The aromatic monoamine particularly includes

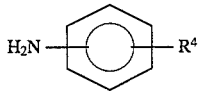

(wherein $R^4$ is as defined above),

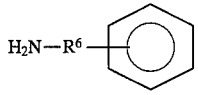

(wherein $R^6$ is as defined above) and the like, and specifically includes, among others, aniline, o-toluidine, m-toluidine, p-toluidine, o-ethylaniline, p-ethylaniline, o-propylaniline, m-propylaniline, p-propylaniline, o-cumidine, m-cumidine, p-cumidine, o-tert-butylaniline, p-n-butylaniline, p-isobutylaniline, p-sec-butylaniline, p-tert-butylaniline, p-n-amylaniline, p-isoamylaniline, p-sec-amylaniline, p-tert-amylaniline, p-hexylaniline, p-heptylaniline, p-octylaniline, p-nonylaniline, p-decylaniline, p-undecylaniline, p-dodecylaniline, p-cyclohexylaniline, o-aminodiphenyl, m-aminodiphenyl, p-aminodiphenyl, p-aminostyrene, benzylamine, α-phenylethylamine, β-phenylethylamine, α-phenylpropylamine, β-phenylpropylamine and γ-phenylpropylamine.

Among the amide compounds of the formula (1), those which are particularly preferable include N,N'-diphenylhexanediamide, N,N'-dicyclohexylterephthalamide, or N,N'-dicyclohexyl-2,6-naphthalenedicarboxamide.

Amide compounds of the formula (2)

The amide compound of the formula (2) can be easily produced by subjecting an aliphatic, alicyclic, heterocyclic or aromatic diamine of the formula $$H_2N—R^8—NH_2 \qquad (2a)$$

wherein $R^8$ is as defined hereinbefore and an alicyclic or aromatic monocarboxylic acid of the formula $$R^9—COOH \text{ or } R^{10}—COOH$$

wherein $R^9$ and $R^{10}$ are as defined above to an amidation reaction in the conventional manner.

This amidation reaction can be conducted in various conventional ways, but typically any one of the following processes may be mentioned.

(i) The above-mentioned diamine is reacted with the monocarboxylic acid in an inert solvent at about 60° to 200° C. for about 2 to 8 hours. The monocarboxylic acid is used generally in an amount of about 2 to 10 equivalents per one equivalent of the diamine. In this process, an activator is preferably used to accelerate the reaction. The activator that can be used includes phosphorus pentaoxide, polyphosphoric acid, phosphorus pentaoxide-methanesulfonic acid, phosphorous ester (e.g. triphenyl phosphite)-pyridine, phosphorous ester-metal salt (e.g. lithium chloride), triphenylphosphine-hexachloroethane and so on. The activator is used generally in an equimolar amount with respect to the diamine.

(ii) The above diamine is reacted with the acid chloride of said monocarboxylic acid in an inert solvent at about 0° to 100° C. for about 1 to 5 hours. The monocarboxylic acid chloride is used generally in an amount of 2 to 3 equivalents per one equivalent of the diamine.

(iii) The above diamine is reacted with an ester, particularly a $C_{1-3}$ alkyl ester, of said monocarboxylic acid in an inert solvent in the presence of a catalyst at about 0° to 150° C. for about 3 to 10 hours. The monocarboxylic acid ester is generally used in an amount of about 2 to 20 equivalents per one equivalent of the diamine. The catalyst may be an acid or basic catalyst that is conventionally used in ester-amide interchange reactions, and is preferably a basic catalyst. Thus, there may be mentioned lithium, sodium, potassium; alkali metal hydrides such as lithium hydride, sodium hydride, potassium hydride, etc.; alkali metal hydroxides such as lithium hydroxide, sodium hydroxide, potassium hydroxide etc.; metal alkoxides such as sodium methoxide, sodium ethoxide, potassium tert-butoxide, etc.; and alkali metal amides such as sodium amide, lithium dipropylamide, etc., among others.

When $R^9$ and $R^{10}$ in the formula (2) are different from each other, a substantially equimolar mixture of 2 kinds of corresponding monocarboxylic acids (or a substantially equimolar mixture of 2 kinds of corresponding monocarboxylic acid chlorides or a substantially equimolar mixture of 2 kinds of corresponding monocarboxylic acid esters) is employed.

The inert solvent which can be used for the above processes (i), (ii) and (iii) include, among others, benzene, toluene, xylene, chloroform, chlorobenzene, dichlorobenzene, tetrahydrofuran, dioxane, acetonitrile, N,N-dimethylformamide, N,N-dimethylacetamide and N-methylpyrrolidone.

The compound obtained by the above processes can be isolated and purified by the conventional procedures such as chromatography, reprecipitation, recrystallization, fractional crystallization and so on.

In the above processes (i), (ii) and (iii), the diamine of the formula (2a) is the aliphatic, alicyclic, heterocyclic or aromatic diamine corresponding to $R^8$. Thus, $R^8$ is a residue formed by elimination of the two amino groups of one of the following aliphatic, alicyclic, heterocyclic and aromatic diamines.

Thus, the aliphatic diamine includes $C_{1-24}$, preferably $C_{1-12}$ aliphatic diamines such as 1,2-diaminoethane, 1,2-diaminopropane, 1,3-diaminopropane, 1,4-diaminobutane, 1,3-diaminopentane, 1,5-diaminopentane, 1,6-diaminohexane, 1,8-diaminooctane, 1,10-diaminodecane, 1,11-diaminoundecane, etc.

The alicyclic diamine includes $C_{4-28}$, preferably $C_{6-15}$ alicyclic diamines such as 1,2-diaminocyclohexane, 1,4-diaminocyclohexane, 4,4'-diaminodicyclohexyl, 4,4'-diamino-3,3'-dimethyldicyclohexyl, 4,4'-diaminodicyclohexylmethane, 4,4'-diamino-3,3'-dimethyldicyclohexylmethane, 1,3-bis(aminomethyl)cyclohexane, 1,4-bis(aminomethyl)cyclohexane, and additionally includes isophoronediamine, menthenediamine and so on.

The heterocyclic diamine includes 5- or 6-membered heterocyclic diamines containing 1 or 2 nitrogen or sulfur atoms in the ring structure and having 4 to 14 carbon atoms, such as 2,3-diaminopyridine, 2,6-diaminopyridine, 3,4-diaminopyridine, o-tolidinesulfone and so on.

The aromatic diamine includes those containing 6 to 28, preferably 6 to 15 carbon atoms, such as o-phenylenediamine, m-phenylenediamine, p-phenylenediamine, 2,3-diaminotoluene, 2,4-diaminotoluene, 2,6-diaminotoluene, 3,4-diaminotoluene, 4,6-dimethyl-m-phenylenediamine, 2,5-dimethyl-p-phenylenediamine, 4,5-dimethyl-o-phenylenediamine, o-xylenediamine m-xylylenediamine, p-xylylenediamine, 2,4-diaminomesitylene, 1,5-diaminonaphthalene, 1,8-diaminomesitylene, 2,3-diaminonaphthalene, 2,7-diaminonaphthalene, naphthalene, 9,10-diaminophenanthrene, 3,3',5,5'-tetramethylbenzidine, 3,3'-dimethyl-4,4'-diaminobiphenyl, 3,3'-dimethoxy-4,4'-diaminobiphenyl, 4,4'-diaminodiphenylmethane, 3,3'-diaminodiphenylmethane, 3,4'-diaminodiphenylmethane, 4,4'-methylenedi-o-toluidine, 4,4'-methylenedi-2,6-xylidine, 4,4' -methylenedi-2,6-diethylaniline, 4,4'-diamino-1,2-diphenylethane, 4,4'-diamino-2,2'-dimethylbibenzyl, 4,4'-diaminostilbene, 3,4'-diamino-2,2-diphenylpropane, 4,4' -diamino-2,2-diphenylpropane, 4,4'-diaminodiphenylether, 3,4'-diaminodiphenylether, 4,4'-thiodianiline, 2,2'-dithiodianiline, 4,4'-dithiodianiline, 3,3'-diaminodiphenylsulfone, 4,4'-diaminodiphenylsulfone, 3,3'-diaminobenzophenone, 4,4'-diaminobenzophenone, 4,4'-diaminobenzanilide, 2,7-diaminofluorene, 3,7-diamino-2-methoxyfluorene, bis-p-aminophenylaniline, 1,3-bis(4-aminophenylpropyl)benzene, 1,4-bis(4-aminophenylpropyl)benzene, 1,3-bis(4-aminophenoxy)benzene, 1,4-bis(4-aminophenoxy)benzene, 4,4'-bis(4-aminophenoxy)biphenyl, bis[4-(4-aminophenoxy)phenyl]ether, bis[4-(4-aminophenoxy)phenyl]sulfone, 9,9-bis(4-aminophenyl)fluorene and so on.

As examples of the alicyclic monocarboxylic acid represented by $R^9$—COOH or $R^{10}$—COOH, there may be mentioned $C_4$–$C_{13}$ cycloalkanecarboxylic acids, $C_4$–$C_{13}$ cycloalkenecarboxylic acids,

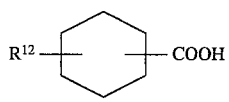

(wherein $R^{12}$ is as defined above),

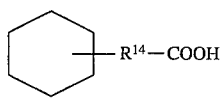

(wherein $R^{14}$ is as defined above), etc., and examples thereof are cyclopropanecarboxylic acid, cyclobutanecarboxylic acid, cyclopentanecarboxylic acid, 1-methylcyclopentanecarboxylic acid, 2-methylcyclopentanecarboxylic acid, 3-methylcyclopentanecarboxylic acid, 1-phenylcyclopentanecarboxylic acid, cyclopentenecarboxylic acid, cyclohexanecarboxylic acid, 1-methylcyclohexanecarboxylic acid, 2-methylcyclohexanecarboxylic acid, 3 -methylcyclohexane-carboxylic acid, 4-methylcyclohexanecarboxylic acid, 4-propylcyclohexanecarboxylic acid, 4 -butylcyclohexanecarboxylic acid, 4-pentylcyclohexanecarboxylic acid, 4-hexylcyclohexanecarboxylic acid, 4 -phenylcyclohexanecarboxylic acid, 1-phenylcyclohexanecarboxylic acid, cyclohexenecarboxylic acid, 4-butylcyclohexenecarboxylic acid, cycloheptanecarboxylic acid, 1-cycloheptene-carboxylic acid, 1-methylcycloheptanecarboxylic acid, 4-methylcycloheptanecarboxylic acid, cyclohexylacetic acid and so on.

As examples of the aromatic monocarboxylic acid represented by $R^9$—COOH or $R^{10}$—COOH, there may be mentioned

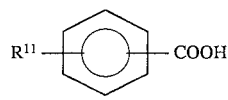

(where $R^{11}$ is as defined above),

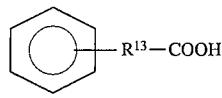

(wherein $R^{13}$ is as defined above), etc., and examples thereof are benzoic acid, o-methylbenzoic acid, m-methylbenzoic acid, p-methylbenzoic acid, o-ethylbenzoic acid, p-propylbenzoic acid, p-butylbenzoic acid, p-tert-butylbenzoic acid, p-pentyl-benzoic acid, p-hexylbenzoic acid, o-phenylbenzoic acid, p-phenylbenzoic acid, p-cyclohexylbenzoic acid, phenylacetic acid, phenylpropionic acid, phenylbutyric acid and so on.

Among the diamide compounds of the formula (2) which can be obtained from the diamine and monocarboxylic acid, more desirable compounds are N,N'-dicyclohexanecarbonyl-p-phenylenediamine, N,N'-dibenzoyl-1,5-diaminonaphthalene, N,N'-dibenzoyl-1,4-diaminocyclohexane, N,N'-dicyclohexanecarbonyl-1,4-diaminocyclohexane, etc.

Amide compounds of the formula (3)

The amide compound of the formula (3) can be easily prepared by subjecting an aliphatic, alicyclic or aromatic amino acid of the formula (3a)

$$NH_2—R^{15}—COOH \quad (3a)$$

wherein $R^{15}$ is as defined hereinbefore, a monocarboxylic acid chloride of the formula $R^{16}$—COCl (wherein $R^{16}$ is as defined hereinbefore) and a monoamine of the formula $R^{17}$—$NH_2$ (wherein $R^{17}$ is defined hereinabove) to an amidation reaction.

This amidation reaction can be conducted, for example by reacting said amino acid of the formula (3a) with 1 to 2 equivalents of said monocarboxylic acid chloride in an inert solvent at about 0° to 100° C. for about 1 to 5 hours, then adding 1 to 5 equivalents, based on the reaction product, of said monoamine and conducting the reaction, preferably in the presence of the activator mentioned for process (i), at a temperature of about 60° to 200° C. for about 2 to 8 hours. The inert solvent may be any of the solvents mentioned hereinbefore in connection with process (i) for the production of said compound of the formula (2).

The compound obtained by the above process is purified by the conventional isolation and purification procedures such as chromatography, reprecipitation, recrystallization, fractional crystallization and so on.

The amino acid (3a) to be used in the above process is the aliphatic, alicyclic or aromatic amino acid corresponding to $R^{15}$. Thus, $R^{15}$ is a residue formed by elimination of one amino group and one carboxyl group from one of the aliphatic, alicyclic and aromatic amino acids mentioned below.

As preferred examples of said aliphatic amino acid, there may be mentioned $C_{2-29}$, more preferably $C_{2-13}$, saturated or unsaturated aliphatic amino acids such as aminoacetic acid, α-aminopropionic acid, β-aminopropionic acid, α-aminoacrylic acid, α-aminobutyric acid, β-aminobutyric acid, γ-aminobutyric acid, α-amino-α-methylbutyric acid, γ-amino-α-methylbutyric acid, α-aminoisobutyric acid, β-aminoisobutyric acid, α-amino-n-valeric acid, δ-amino-n-valeric acid, β-aminocrotonic acid, α-amino-βmethylvaleric acid, α-aminoisovaleric acid, 2-amino-4-pentenoic acid, α-amino-n-caproic acid, 6-aminocaproic acid, α-aminoisocaproic acid, 7-aminoheptanoic acid, α-amino-n-caprylic acid, 8-aminocaprylic acid, 9-aminononanoic acid, 11-amino-undecanoic acid, 12-aminododecanoic acid and so on.

The alicyclic amino acid includes $C_{7-13}$ saturated or unsaturated alicyclic amino acids such as 1-aminocyclohexanecarboxylic acid, 2-aminocyclohexanecarboxylic acid, 3-aminocyclohexanecarboxylic acid, 4-aminocyclohexanecarboxylic acid, p-aminomethylcyclohexane-carbonyl acid, 2-amino-2-norbornanecarboxylic acid and so on.

The aromatic amino acid specifically includes $C_{7-15}$ aromatic amino acids such as α-aminophenylacetic acid, α-amino-β-phenylpropionic acid, 2-amino-2-phenylpropionic acid, 3-amino-3-phenylpropionic acid, α-aminocinnamic acid, 2-amino-4-phenylbutyric acid, 4-amino-3-phenylbutyric acid, anthranilic acid, m-aminobenzoic acid, p-aminobenzoic acid, 2-amino-4-methylbenzoic acid, 2-amino-6-methylbenzoic acid, 3-amino-4-methylbenzoic acid, 2-amino-3-methylbenzoic acid, 2-amino-5-methylbenzoic acid, 4-amino-2-methylbenzoic acid, 4-amino-3-methylbenzoic acid, 2-amino-3-methoxybenzoic acid, 3-amino-4-methoxybenzoic acid, 4-amino-2-methoxybenzoic acid, 4-amino-3-methoxybenzoic acid, 2-amino-4,5-dimethoxybenzoic acid, o-aminophenylacetic acid, m-aminophenylacetic acid, p-aminophenylacetic acid, 4-(4-aminophenyl)butyric acid, 4-aminomethylbenzoic acid, 4-aminomethylphenylacetic acid, o-aminocinnamic acid, m-aminocinnamic acid, p-aminocinnamic acid, p-aminohippuric acid, 2-amino-1-naphthoic acid, 3-amino-1-naphthoic acid, 4-amino-1-naphthoic acid, 5-amino-1-naphthoic acid, 6-amino-1-naphthoic acid, 7-amino-1-naphthoic acid, 8-amino-1-naphthoic acid, 1-amino-2-naphthoic acid, 3-amino-2-naphthoic acid, 4-amino-2-naphthoic acid, 5-amino-2-naphthoic acid, 6-amino-2-naphthoic acid, 7-amino-2-naphthoic acid, 8-amino-2-naphthoic acid and so on.

The monoamine ($R^{17}$—$NH_2$) as a starting compound for the amide compound of the formula (3) is identical with the monoamine ($R^2$—$NH_2$ or $R^3$—$NH_2$) used as a starting compound for the amide compound of the formula (1), and similarly the monocarboxylic acid chloride ($R^{16}COCl$) is one derived from the monocarboxylic acid which is identical with the monocarboxylic acid ($R^9COOH$ or $R^{10}COOH$) used as a starting compound for the amide compound of the formula (2).

Among various species of the amide compound of the formula (3), N-cyclohexyl-4-(N-cyclohexylcarbonylamino)-benzamide and N-phenyl-5-(N-benzoylamino)pentanamide, for instance, are particularly effective.

Among the amide compounds of the formulas (1), (2) and (3), the amide compound of the formula (1) is preferred.

Said amide compounds of the formulas (1), (2) and (3) may be added during the preparation of the polypropylene-based resin or may be mixed with a resin prepared separately.

The amount of the amide compound to be added is 0.0001 to 5 parts by weight, preferably 0.001 to 1 part by weight, per 100 parts by weight of the polypropylene-based resin. If the proportion Of the amide compound is less than 0.0001 part by weight, the formation of β-form crystals may not be sufficient, while the use of the amide compound in excess of 5 parts by weight may not be rewarded with a commensurate effect and be uneconomical, and tends to reduce the elongation at break and tensile strength at break of the stretched article.

The temperature at which the polypropylene-based resin composition is melted is in the range of about 190° to 300° C., preferably about 200° to 280° C.

The crystallizing temperature (cooling temperature) of the melt of the resin composition in the process of this invention is in the range of about 15° to 140° C., preferably about 20° to 120° C., more preferably about 70° to 120° C. The content of β-form crystals (K value) in the unstretched product thus obtained is about 0.5 to 1.0 which is a range suitable for practical use. This crystallizing step is performed, for example, by extruding the polypropylene-based resin containing at least one of the β-nucleating agents of the formulas (1), (2) and (3) into a sheet, and then cooling and solidifying the thus obtained sheet by a chill roll maintained at a temperature within the above-specified temperature range to thereby form β-form crystals, as will be described in examples.

The obtained unstretched product of polypropylene-based resin containing β-form crystals is then stretched in a conventional manner but under a specific temperature condition. It is important in the present invention to stretch the unstretched product of polypropylene-based resin containing β-form crystals at a temperature which is higher than 20° C. but lower than the melting point of the β-form crystals in said unstretched product. The melting point of the β-form crystals in said unstretched product can be easily measured by differential scanning calorimetry, and is up to about 150° C. and depends on the kind of polypropylene-based resin. For achieving higher porosity, the upper limit of the temperature at which the unstretched product is stretched is preferably a temperature which is lower than the melting point of the β-form crystals in said unstretched product by at least 10 degrees. In other words, it is preferable to conduct stretching at a temperature which is lower than Ts (° C.) defined by the following equation $$Ts = Tm - 10$$

wherein Tm is the melting point (° C.) of the β-form crystals in the unstretched product. From the standpoint of the stretching operation, the stretching temperature is preferably not lower than 70° C., more preferably not lower than 90° C.

The stretched product of the present invention having a sufficient porosity (e.g. at least 10%, preferably about 20 to 80%) can be prepared only by conducting the crystallization step at a temperature within the above temperature range, and then conducting stretching at a temperature within the above-specified temperature range.

Stretching mode to be employed is uniaxial stretching or simultaneous or successive biaxial stretching.

The uniaxial stretching and the simultaneous or successive biaxial stretching can be conducted by conventional methods. In case of biaxial stretching, the extent of stretching is not specifically limited, and a preferred draw ratio is, for example, about 1.2 to 5.0, preferably 1.7 to 2.8, in the machine direction or longitudinal direction and about 1.2 to 5.0, preferably 18 to 2.6, in the transverse direction. In case of uniaxial stretching, the extent of stretching is also not specifically limited, and a preferred draw ratio is, for example, about 1.5 to 6.0, preferably 2.5 to 3.

The pressure conditions to be employed in the process are variable over a wide range and can be any of normal pressure, increased pressure and reduced pressure.

If required, the polypropylene-based resin composition to be used in the present invention may contain a variety of conventional additives such as a stabilizer (e.g. epoxy compounds), an antioxidant (e.g. phenol compounds and phosphorous acid ester compounds), an ultraviolet absorber (e.g. benzophenone compounds and benzotriazole compounds), a neutralizer, a nucleating agent, an antistatic agent, an antiblocking agent, a lubricant (e.g. aliphatic hydrocarbons, higher fatty acids and the alkali metal salts or alkaline earth metal salts thereof, fatty acid esters, higher fatty acid amides, rosin derivatives, etc.), a colorant, an elastomer, and a mineral (e.g. talc and hydrotalcite), each within a range not interfering with the effect of the invention.

The stretched or oriented product of polypropylene-based resin thus obtained is used to produce an opaque film which is excellent in whiteness, hiding power, printability and writability, or to produce a porous membrane having a multiplicity of interpenetrating pores. The opaque film finds wide applications as materials for printing sheets, tracing paper, food packaging films, etc. The porous membranes are extensively used, for example, in the form of films or hollow yarns, for various applications as membranes for moisture-permeating and water-proofing purposes, as filters or separating membranes for purification of air or disposal of waste water, as medical materials for plasma-separating membranes or artificial lungs, as battery separators useful for batteries and electrolysis, and so on.

EXAMPLES

The following examples and comparative examples are intended to describe the invention in further detail. In these examples and comparative examples, the content of β-form crystals and the porosity were determined by the following methods.

(1) Determination of β-form crystal content (i) X-ray method

A sample (polypropylene-based resin cast film, unstretched film) was subjected to X-ray diffraction and a K value was obtained by the following equation.

$$K \text{ value} = \frac{H(\beta_1)}{H(\beta_1) + H(\alpha_1) + H(\alpha_2) + H(\alpha_3)}$$

wherein:

$H(\beta_1)$ is a reflection intensity (height) on (300) plane of β-form crystal;

$H(\alpha_1)$ is a reflection intensity (height) on (110) plane of α-form crystal;

$H(\alpha_2)$ is a reflection intensity (height) on (040) plane of α-form crystal; and $H(\alpha_3)$ is a reflection intensity (height) on (130) plane of α-form crystal.

(ii) DSC method

A sample (about 5 mg), cut from the polypropylene-based resin cast film (unstretched film) obtained in each of Examples and Comparative Examples, is set in the sample holder of a differential scanning calorimeter (DSC) and heated in a nitrogen gas atmosphere at a rate of 20° C./min. From the peak areas of the α- and β-form crystals on the DSC thermogram thus obtained, the β-form crystal content (area %, hereinafter "DSC %") is calculated.

(2) Determination of porosity

Salad oil (ρ=0.925 g/cm³) was impregnated into a sample stretched film by immersing the sample in the salad oil at room temperature for 5 minutes. The salad oil adhered to the surface of the sample was wiped with a methanol-impregnated paper. Then the weight of the sample film was measured and the volume of the salad oil impregnated into the film was calculated. The porosity was given by the following equation $$\alpha = (V_o/V_f) \times 100$$

wherein α is the porosity (%), Vo is a volume of salad oil impregnated into the film; and Vf is an apparent volume of the sample film.

Examples 1 to 7

To 100 parts by weight of a propylene homopolymer powder with MFR of 14 g/10 min (hereinafter called "PP (1)") was added 0.1 part by weight of N,N'-dicyclohexyl-2,6-naphthalenedicarboxamide (hereinafter called "nucleating agent 1") as a β-nucleating agent. The mixture was milled in a Henschel mixer and pelletized at 240° C. The resulting pellets were extruded by a T-die extruder into a sheet at a resin temperature of 240° C., and the sheet was cooled and solidified by a chill roll maintained at a temperature shown in Table 1 (Cooling temperature) to give an unstretched polypropylene cast film having a thickness of 200 μm. Table 1 below shows the content of β-form crystals (K value and DSC %) each of the unstretched films thus obtained.

Then each of the unstretched films was uniaxially or biaxially stretched into a white opaque film under the conditions shown in Table 1. In each of Examples 1–7 (and also in each of Examples 8–17 and Comparative Example 1 that follow), the stretching temperature was lower than the melting point of the β-form crystals contained in the unstretched product as determined by a differential scanning calorimeter (DSC). The melting point of the β-form crystals of PP(1) is 152° C.

Then, salad oil was impregnated into these stretched films, and the films were thereby all rendered translucent. This means that they were porous films having excellent interpenetrating pore structure.

Table 1 shows the thickness of the stretched film, and the porosity (%) of the stretched film as calculated from the amount of impregnated salad oil.

Example 8

A stretched film was prepared in a manner similar to Example 3 using a propylene homopolymer powder with MFR of 4.3 g/10 min (hereinafter called "PP (2)"). The melting point of the β-form crystals of PP(2) is 147° C. The obtained film was a porous film having excellent interpenetrating pore structure.

Table 1 shows the content of β-form crystals (K value and DSC %) of the unstretched film and the thickness and porosity (%) of the stretched film.

Example 9

A stretched film was prepared in a manner similar to Example 3 using a propylene homopolymer powder with MFR of 1.4 g/10 min (hereinafter called "PP (3)"). The melting point of the β-form crystals of PP(3) is 148° C. The obtained film was a porous film having excellent interpenetrating pore structure.

Table 1 shows the content of β-form crystals (K value and DSC %) of the unstretched film and the thickness and porosity of the stretched film.

Example 10

Except that PP (3) was used, the procedure of Example 6 was substantially followed to provide an unstretched film. A stretched film was obtained by uniaxially drawing the unstretched film at 90° C. The stretched film was a porous film having excellent interpenetrating pore structure.

Table 1 shows the content of β-form crystals (K value and DSC %) of the unstretched film and the thickness and porosity of the stretched film.

Examples 11 and 12

Stretched films were prepared in a manner similar to Example 1 using different amounts of nucleating agent 1. The stretched films were porous films having excellent interpenetrating pore structure.

Table 1 shows the content of β-form crystals (K value and DSC %) each of the unstretched films and the thickness and porosity each of the stretched films.

Example 13

A stretched film was prepared in a manner similar to Example 1 using N,N'-dicyclohexylterephthalamide (hereinafter called "nucleating agent 2") as the β-nucleating agent.

Table 1 shows the content of β-form crystals (K value and DSC %) of the unstretched film and the thickness and porosity of the stretched film.

Example 14

A stretched film was prepared in a manner similar to Example 1 using N,N'-diphenylhexanediamide (hereinafter called "nucleating agent 3") as the β-nucleating agent.

Table 1 shows the content of β-form crystals (K value and DSC %) of the unstretched film and the thickness and porosity of the stretched film.

Example 15

A stretched film was prepared in a manner similar to Example 1 using N,N'-dicyclohexanecarbonyl-p-phenylenediamine (hereinafter called "nucleating agent 4") as the β-nucleating agent.

Table 1 shows the content of β-form crystals (K value and DSC %) of the unstretched film and the thickness and porosity of the stretched film.

Example 16

A stretched film was prepared in a manner similar to Example 1 using N,N'-dibenzoyl-1,4-diaminocyclohexane (hereinafter called "nucleating agent 5") as the β-nucleating agent.

Table 1 shows the content of β-form crystals (K value and DSC %) of the unstretched film and the thickness and porosity of the stretched film.

Example 17

A stretched film was prepared in a manner similar to Example 1 using N-cyclohexyl-4-(N-cyclohexylcarbonylamino)-benzanide (hereinafter called "nucleating agent 6") as the β-nucleating agent.

Table 1 shows the content of β-form crystals (K value and DSC %) of the unstretched film and the thickness and porosity of the stretched film.

Comparative Example 1

Except that cooling and solidification were performed by a chill roll maintained at 10° C., the procedure of Example 1 was followed to provide an unstretched film. Table 1 shows the content of β-form crystals (K value and DSC %) of the unstretched film.

A stretched film was obtained by uniaxially drawing the unstretched film at 130° C. The obtained film was translucent and had a low porosity, as shown in Table 1.

Comparative Example 2

Except that cooling and solidification were performed by a chill roll maintained at 20° C., the procedure of Example 1 was followed to provide an unstretched film. Table 1 shows the content of β-form crystals (K value and DSC %) of the unstretched film.

A stretched film was obtained by uniaxially drawing the unstretched film at 155° C. The obtained film was substantially transparent and no salad oil was impregnated into the film.

Comparative Example 3

Except that a nucleating agent was not used, the procedure of Example 1 was otherwise repeated to provide an unstretched film. Table 1 shows the content of β-form crystals (K value and DSC %) of the unstretched film.

A stretched film was obtained by biaxially stretching the unstretched film at 125° C. The obtained film was substantially transparent and no salad oil was impregnated into the film.

TABLE 1

|  |  |  | Example |  |  |  |  |  |  |
|---|---|---|---|---|---|---|---|---|---|
|  |  |  | 1 | 2 | 3 | 4 | 5 | 6 | 7 |
| Formulation (parts by weight) | PP(1) |  | 100 | 100 | 100 | 100 | 100 | 100 | 100 |
|  | PP(2) |  | — | — | — | — | — | — | — |
|  | PP(3) |  | — | — | — | — | — | — | — |
|  | Nucleating agent 1 |  | 0.1 | 0.1 | 0.1 | 0.1 | 0.1 | 0.1 | 0.1 |
|  | Nucleating agent 2 |  | — | — | — | — | — | — | — |
|  | Nucleating agent 3 |  | — | — | — | — | — | — | — |
|  | Nucleating agent 4 |  | — | — | — | — | — | — | — |
|  | Nucleating agent 5 |  | — | — | — | — | — | — | — |
|  | Nucleating agent 6 |  | — | — | — | — | — | — | — |
| Film-forming conditions | Cooling temperature (°C.) |  | 110 | 110 | 110 | 110 | 70 | 50 | 20 |
|  | Stretching temperature (°C.) |  | 125 | 125 | 110 | 150 | 110 | 100 | 90 |
|  | Draw ratio | MD | 1.7 | 2.8 | 2.8 | 2.8 | 2.8 | 2.8 | 2.5 |
|  |  | TD | 1.9 | 2.6 | — | — | — | — | — |

TABLE 1-continued

| Content of β- | K value | 0.89 | 0.89 | 0.89 | 0.89 | 0.90 | 0.90 | 0.87 |
|---|---|---|---|---|---|---|---|---|
| | DSC % | 79.6 | 79.6 | 79.6 | 79.6 | 66.2 | 603 | 34.8 |
| Film thickness (μm) | | 70 | 35 | 135 | 130 | 125 | 120 | 130 |
| Porosity (%) | | 39.3 | 39.0 | 30.3 | 22.4 | 28.2 | 25.4 | 22.3 |

| | | Example | | | | | | |
|---|---|---|---|---|---|---|---|---|
| | | 8 | 9 | 10 | 11 | 12 | 13 | 14 |
| Formulation (parts by weight) | PP(1) | — | — | — | 100 | 100 | 100 | 100 |
| | PP(2) | 100 | — | — | — | — | — | — |
| | PP(3) | — | 100 | 100 | — | — | — | — |
| | Nucleating agent 1 | 0.1 | 0.1 | 0.1 | 0.05 | 0.2 | — | — |
| | Nucleating agent 2 | — | — | — | — | — | 0.1 | — |
| | Nucleating agent 3 | — | — | — | — | — | — | 0.1 |
| | Nucleating agent 4 | — | — | — | — | — | — | — |
| | Nucleating agent 5 | — | — | — | — | — | — | — |
| | Nucleating agent 6 | — | — | — | — | — | — | — |
| Film-forming conditions | Cooling temperature (°C.) | 110 | 110 | 50 | 110 | 110 | 110 | 110 |
| | Stretching temperature (°C.) | 110 | 110 | 90 | 125 | 125 | 125 | 125 |
| | Draw ratio MD | 3.0 | 3.0 | 2.5 | 1.8 | 2.0 | 1.9 | 2.0 |
| | TD | — | — | — | 1.9 | 2.2 | 2.1 | 1.9 |
| Content of β-form crystals | K value | 0.90 | 0.91 | 0.90 | 0.90 | 0.92 | 0.84 | 0.84 |
| | DSC % | 79.4 | 78.9 | 56.6 | 77.5 | 79.4 | 77.9 | 79.1 |
| Film thickness (μm) | | 125 | 125 | 130 | 70 | 60 | 65 | 65 |
| Porosity (%) | | 23.4 | 24.2 | 21.5 | 27.2 | 40.2 | 30.5 | 33.0 |

| | | Example | | | Comparative Example | | |
|---|---|---|---|---|---|---|---|
| | | 15 | 16 | 17 | 1 | 2 | 3 |
| Formulation (part by weight) | PP(1) | 100 | 100 | 100 | 100 | 100 | 100 |
| | PP(2) | — | — | — | — | — | — |
| | PP(3) | — | — | — | — | — | — |
| | Nucleating agent 1 | — | — | — | 0.1 | 0.1 | — |
| | Nucleating agent 2 | — | — | — | — | — | — |
| | Nucleating agent 3 | — | — | — | — | — | — |
| | Nucleating agent 4 | 0.1 | — | — | — | — | — |
| | Nucleating agent 5 | — | 0.1 | — | — | — | — |
| | Nucleating agent 6 | — | — | 0.1 | — | — | — |
| Film-forming conditions | Cooling temperature (°C.) | 110 | 110 | 110 | 10 | 20 | 110 |
| | Stretching temperature (°C.) | 125 | 125 | 125 | 130 | 155 | 125 |
| | Draw ratio MD | 1.9 | 2.1 | 2.1 | 2.5 | 2.5 | 2.8 |
| | TD | 2.0 | 2.1 | 1.8 | — | — | 2.6 |
| Content of β-form crystals | K value | 0.89 | 0.87 | 0.85 | 0.70 | 0.87 | 0.00 |
| | DSC % | 71.4 | 70.3 | 68.7 | 14.1 | 34.8 | 0.00 |
| Film thickness (μm) | | 65 | 60 | 65 | 100 | 100 | 35 |
| Porosity (%) | | 25.0 | 26.5 | 23.8 | 2.16 | 0.00 | 0.00 |

Notes: MD = machine direction
TD = transverse direction

EFFECTS OF THE INVENTION

When the amide compound of the present invention is used as a β-nucleating agent, a stretched porous product of a polypropylene-based resin can be easily prepared on a commercial basis under practical conditions. The stretched product is useful as materials for printing sheets, filtration membranes, separating membranes, etc.

What is claimed is:

1. A process for producing a porous stretched article of polypropylene-based resin, the process comprising the steps of crystallizing a melt of a polypropylene-based resin composition, wherein the polypropylene-based resin is selected from the group consisting of polyene homopolymers, random and block copolymers of propylene as a predominant comonomer and at least one selected from the group consisting of ethylene and at least one 1-alkene, propylene-ethylene copolymers which further contain other comonomer(s) selected from the group consisting of 5-ethylidene-2-nornornene, 5-methylene-2-norbornene and 1,4-hexadiene, propylene-styrene copolymers, and a blend of polypropylene and a small quantity of a thermoplastic resin selected from the group consisting of high-density polyethylene, polybutene-1 and poly-4-methylpentene-1, and wherein the polypropylene-based resin has a melt flow rate of about 0.1 to 100 g/10 min, at a temperature of 15° to 140° C. to form a solidified product containing β-form crystals and stretching the resulting solidified product at a temperature which is higher than 20° C. but lower than the melting point of the β-form crystals in said solidified product, the polypropylene-based resin composition consisting essentially of the polypropylene-based resin and 0.0001 to 5 parts by weight, per 100 parts by weight of the polypropylene-based resin, of at least one amide compound selected from the group consisting of:

(1) an amide compound of the formula $$R^2\text{---}NHCO\text{---}R^1\text{---}CONH\text{---}R^3 \qquad (1)$$

wherein $R^1$ is a residue formed by elimination of the two carboxyl groups of a $C_{3-26}$ saturated or unsaturated aliphatic dicarboxylic acid, a $C_{6-30}$ saturated or unsaturated alicyclic dicarboxylic acid or a $C_{8-30}$ aromatic dicarboxylic acid; $R^2$ and $R^3$ are the same or different and each represents a $C_{3-18}$ cycloalkyl group, a $C_{3-12}$ cycloalkenyl group, or a group of the formula

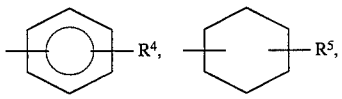

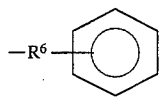

or

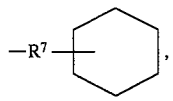

wherein $R^4$ is a hydrogen atom, a $C_{1-12}$ straight- or branched-chain alkyl group, a $C_{2-12}$ straight- or branched-chain alkenyl group, a $C_{6-10}$ cycloalkyl group or a phenyl group; $R^5$ is a $C_{1-12}$ straight- or branched-chain alkyl group or a $C_{2-12}$ straight- or branched-chain alkenyl group; and $R^6$ and $R^7$ each represents a $C_{1-4}$ straight- or branched-chain alkylene group;

(2) an amide compound of the formula

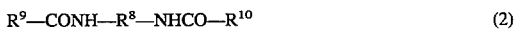

wherein $R^8$ is a residue formed by elimination of the two amino groups of a $C_{1-24}$ saturated or unsaturated aliphatic diamine, a $C_{4-28}$ alicyclic diamine, a $C_{4-14}$ heterocyclic diamine or a $C_{6-28}$ aromatic diamine; $R^9$ and $R^{10}$ are the same or different and each represents a $C_{3-12}$ cycloalkyl group, a $C_{3-12}$ cycloalkenyl group, or a group of the formula

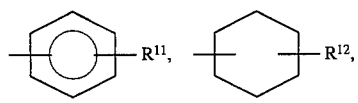

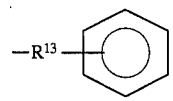

or

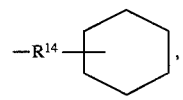

wherein $R^{11}$ is a hydrogen atom, a $C_{1-12}$ straight- or branched-chain alkyl group, a $C_{2-12}$ straight- or branched-chain alkenyl group, a $C_{6-10}$ cycloalkyl group or a phenyl group; $R^{12}$ is a $C_{1-12}$ straight- or branched-chain alkyl group, a $C_{2-12}$ alkenyl group, a $C_{6-10}$ cycloalkyl group or a phenyl group; and $R^{13}$ and $R^{14}$ each represents a $C_{1-4}$ straight- or branched-chain alkylene group; and (3) an amide compound of the formula

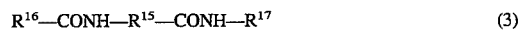

wherein $R^{15}$ is a residue formed by elimination of one amino group and one carboxyl group from of a $C_{2-29}$ saturated or unsaturated aliphatic amino acid, $C_{7-13}$ saturated or unsaturated alicyclic amino acid or $C_{7-15}$ aromatic amino acid; $R^{16}$ and $R^{17}$ are the same or different and $R^{16}$ has the same meaning as $R^9$ or $R^{10}$ in the formula (2) and $R^{17}$ has the same meaning as $R^2$ or $R^3$ in the formula (1).

2. A process according to claim 1, wherein the polypropylene-based resin composition contains the amide compound of the formula (1).

3. A process according to claim 2, wherein the amide compound of the formula (1) is N,N'-diphenylhexanediamide, N,N'-dicyclohexylterephthalamide or N,N'-dicyclohexyl-2,6 -naphthalenedicarboxamide.

4. A process according to claim 1, wherein the polypropylene-based resin composition contains the amide compound of the formula (2).

5. A process according to claim 4, wherein the amide compound of the formula (2) is N,N'-dicyclohexanecabonyl-p-phenylenediamine, N,N'-dibenzoyl-1,5-diaminonaphthalene, N,N'-dibenzoyl-1,4-diaminocyclohexane or N,N'-dicyclohexanecarbonyl-1,4-diaminocyclohexane.

6. A process according to claim 1, wherein the polypropylene-based resin composition contains the amide compound of the formula (3).

7. A process according to claim 6, wherein the amide compound of the formula (3) is N-cyclohexyl-4-(N-cyclohexylcarbonylamino)benzamide or N-phenyl-5-(N-benzoylamino)pentanamide.

8. A process according to claim 1, wherein said at least one amide compound is used in an amount of 0.001 to 1 part by weight per 100 parts by weight of the polypropylene-based resin.

9. A process according to claim 1, wherein the melt is crystallized at 20° to 120° C.

10. A process according to claim 1, wherein the melt is crystallized at 70° to 120° C.

11. A process according to claim 1, wherein the solidified product is stretched at a temperature which is not lower than 70° C. but lower than the melting point of the β-form crystals in said product.

12. A process according to claim 1, wherein the solidified product is stretched at a temperature which is not lower than 90° C. but lower than the melting point of the β-form crystals in said product.

13. A process according to claim 1, wherein the solidified product is stretched at a temperature which is not lower than 70° C. but lower than Ts (°C.) which is defined by the equation Ts=Tm−10 wherein Tm is the melting point (°C.) of the β-form crystals in said product.

14. A process according to claim 1, wherein the solidified product is stretched at a temperature which is not lower than 90° C. but lower than Ts (°C.) which is defined by the equation Ts=Tm−10 wherein Tm is the melting point (°C.) of the β-form crystals in said product.

15. A process according to claim 1, wherein the solidified product is stretched by uniaxial stretching.

16. A process according to claim 1, wherein the solidified product is stretched by biaxial stretching.

17. A process for producing a porous stretched article of polypropylene-based resin, the process comprising the steps of crystallizing a melt of a polypropylene-based resin composition, wherein the polypropylene-based resin is selected from the group consisting of propylene homopolymers, random and block copolymers of propylene as a predominant comonomer and at least one comonomer selected from the group consisting of ethylene and at least one 1-alkene, propylene-ethylene copolymers which further contain other comonomer(s) selected from the group consisting of 5-ethylidene-2-norbornene, 5-methylene-2-norbornene and 1,4-hexadiene, propylene-styrene copolymers, and a blend of polypropylene and small quantity of a thermoplastic resin selected from the group consisting of high-density polyethylene, polybutene-1 and poly-4-methylpentene-1, and wherein the polypropylene-based resin has a melt flow rate of about 0.1 to 100 g/10 min, at a temperature of 15° to 140° C. to form a solidified product containing β-form crystals and stretching the resulting solidified product at a temperature which is higher than 70° C. but lower than the melting point of the β-form crystals in said solidified product, the polypropylene-based resin composition consisting essentially of the polypropylene-based resin and 0.0001 to 5 parts by weight, per 100 parts by weight of the polypropylene-based resin, of an amide compound represented by the formula $$R^2-NHCO-R^1-CONH-R^3 \quad (1)$$

wherein $R^1$ is a residue formed by elimination of the two carboxyl groups of a $C_{3-26}$ saturated or unsaturated aliphatic dicarboxylic acid, a $C_{6-30}$ saturated or unsaturated alicyclic dicarboxylic acid or a $C_{8-30}$ aromatic dicarboxylic acids; $R^2$ and $R^3$ are the same or different and each represents a $C_{3-18}$ cycloalkyl group, a $C_{3-12}$ cycloalkenyl group, or a group of the formula

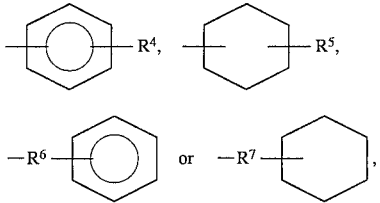

wherein $R^4$ is a hydrogen atom, a $C_{1-12}$ straight- or branched-chain alkyl group, a $C_{2-12}$ straight- or branched-chain alkenyl group, a $C_{6-10}$ cycloalkyl group or a phenyl group; $R^5$ is a $C_{1-12}$ straight- or branched-chain alkyl group or a $C_{2-12}$ straight- or branched-chain alkenyl group; and $R^6$ and $R^7$ are the same or different and each represents a $C_{1-4}$ straight- or branched-chain alkylene group.

18. The porous stretched article of a polypropylene-based resin prepared by the process of claim 1.

19. The porous stretched article of a polypropylene-based resin prepared by the process of claim 17.

* * * * *